United States Patent [19]

Lange

[11] Patent Number: 4,545,949

[45] Date of Patent: Oct. 8, 1985

[54] PROCESS FOR THE MANUFACTURE OF FLAME-RESISTANT AND HYDROPHILIC POLYESTER FIBERS

[75] Inventor: Wolfgang Lange, Obernburg, Fed. Rep. of Germany

[73] Assignee: Akzona Incorporated, Asheville, N.C.

[21] Appl. No.: 578,944

[22] Filed: Feb. 10, 1984

[30] Foreign Application Priority Data

Feb. 18, 1983 [DE] Fed. Rep. of Germany ....... 3305629

[51] Int. Cl.$^4$ ............................................. D01D 1/10
[52] U.S. Cl. .................................... 264/170; 264/171; 264/176 F; 264/210.6; 264/210.8; 264/211; 264/340; 528/286
[58] Field of Search ................. 264/210.6, 210.8, 211, 264/170, 46.1, 171; 528/286

[56] References Cited

U.S. PATENT DOCUMENTS

| | | | |
|---|---|---|---|
| 3,048,564 | 8/1962 | Heffelfinger | 264/170 |
| 4,307,152 | 12/1981 | Mathes et al. | 264/211 |
| 4,371,485 | 2/1983 | Mathes et al. | 264/210.8 |

Primary Examiner—Donald Czaja
Assistant Examiner—Hubert C. Lorin
Attorney, Agent, or Firm—David M. Carter; Jeffrey S. Boone; Francis W. Young

[57] ABSTRACT

Polyester fibers containing an oxalate complex of the general formula $$Me_n[Z(C_2O_4)_m]$$

are obtained by transesterification of terephthalic acid with ethylene glycol where, in addition to conventional transesterification catalysts, such as bivalent zinc, calcium, magnesium and manganese salts, salt formers are added which form a sparingly soluble salt or a complex with the cation of the transesterification catalyst. Preferably, used salt formers are: pelargonic acid, potassium hydrogen sulfate, potassium dihydrogen phosphate, potassium hydrogen phthalate, potassium oxalate, potassium carbonate, potassium hydrogen oxalate, and oxalic acid. In this way, the increase in pressure before the spinneret is considerably slowed down.

7 Claims, No Drawings

PROCESS FOR THE MANUFACTURE OF FLAME-RESISTANT AND HYDROPHILIC POLYESTER FIBERS

BACKGROUND OF THE INVENTION

The invention relates to a process for the manufacture of polyester fibers by spinning a polyester mass containing an oxalato complex and drawing of the resulting yarn, followed, as the case may be, by hydrosetting of the same in the presence of liquid water.

A previously developed process is described in U.S. Pat. Nos. 4,307,152 and 4,371,485. The process for the manufacture of hydrophilic polyester fibers described in the above referenced U.S. patents is characterized by the spinning of a polyester mass containing 1 to 20% by weight of one or several oxalato complexes of the general formula $$Me_n[Z(C_2O_4)m].$$

drawing of the resulting yarn and hydrosetting in the presence of liquid water at temperatures within a range from 90° to 170° C., the meaning of the symbols in the formula being:
Me = at least one of the ions Li, Na, K, Rb, Cs or NH;
Z = at least one complex-forming central atom from the group Mg, Ca, Sr, Ba, Zr, Hf, Ce, V, Cr, Mn, Fe, Co, Ni, Cu, Zn, Cd, B, Al, Ga, In, Sn, Pb, and Sb;
n = ~1, ~2, ~3 or ~4, and
m = ~2, ~3 or ~4.

By means of this process, one obtains polyester fibers having outstanding hydrophilic characteristics and excelling through a high moisture uptake and a very favorable water retentivity. In addition, they are flame-resistant. The corresponding hydrophilic characteristics will not come about without hydrosetting. However, in the spinning of such polyester masses, which, as a result of the transesterification of terephthalic esters with ethylene glycol, still contain metal compounds, in particular zinc, calcium, magnesium, or manganese salts, originating from the transesterification catalyst, there is a danger that the melt pressure ahead of the spinning plate will increase relatively rapidly. Thus, in the conventional melt spinning of polyester masses not containing oxalato complexes, the melt pressure ahead of the spinning plate rises only within a period of about 14 days to pressures of about 300 bar. When polyester masses are spun which contain the oxalato complexes referred to above, the time within which such a high pressure is reached is shortened considerably. After only about 60 to 70 hours, a pressure is reached, at which the spinning process has to be terminated. This makes the manufacturing process of the polyester fibers more expensive.

Consequently, there exists a need for an improved process for the manufacture of polyester fibers, in which such disadvantages will not occur.

OBJECTS OF THE INVENTION

It is, therefore, one object of the invention to make available a process permitting the manufacture of polyester fibers of the type described above with longer spinning plate running times, i.e., a process in which the pressure ahead of the spinning plate will increase more slowly than was the case in the process known heretofore, so that it will be possible to change spinning plates at considerably longer intervals.

Another object of the invention is to provide a process with an improved spinning operation, leading to fibers with good yarn qualities, which are furthermore flame-resistant and, as the case may be, hydrophilic.

SUMMARY OF THE INVENTION

In accordance with one form of this invention there are provided polyester fibers that are flame-resistant and, as the case may be, have been made hydrophilic by means of hydro-setting at 90° to 170° C. in the presence of liquid water, and are obtained by spinning a polyester mass containing 1 to 20% by weight of an oxalato complex of the general formula $$M_n[Z(C_2O_4)m]$$

and drawing of the fibers in the customary manner. The polyester mass is prepared by the transesterification of terephthalic esters with ethylene glycol in the presence of conventional transesterification catalysts containing metal cations, in particular divalent zinc, calcium, magnesium and manganese compounds, followed by polycondensation. In addition, the polyester mass contains a compound forming a salt with the cation of the transesterification catalyst, that is soluble with difficulty in the polyester mass, or is present as a complex. These compounds may be added already before transesterification, between transesterification and polycondensation, or to the finished chips. Preferably, the following are used as salt formers: pelargonic acid, potassium hydrogen sulfate, potassium dihydrogen phosphate, potassium hydrogen phthalate, potassium oxalate, potassium carbonate, potassium hydrogen oxalate and oxalic acid. Addition of the salt formers considerably retards the increase in pressure ahead of the spinning plate during spinning, so that longer spinning plate running times are obtained, the spinning process proceeds more favorably, and good yarn qualities are reached.

DESCRIPTION OF THE PREFERRED EMBODIMENTS

Specific means for solving the problems of having the melt pressure reach a high level in a short period of time is described below. A process for the manufacture of polyester fibers is provided by means of the spinning of a polyester mass containing 1 to 20% by weight of an oxalato complex of the general formula $$Me_n[Z(C_2O_4)m]$$

wherein
Me = at least one of the ions Li, Na, K, Rb, Cs or NH;
Z = at least one complex-forming central atom from the group Mg, Ca, Sr, Ba, Zr, Hf, Ce, V, Cr, Mn, Fe, Co, Ni, Cu, Zn, Cd, B, Al, Ga, In, Sn, Pb, and Sb;
n = ~1, ~2, ~3 or ~4, and
m = ~2, ~3 or ~4.
which mass was obtained by the transesterification of terephthalic esters with ethylene glycol in the presence of conventional transesterification catalysts containing metal cations, in particular of divalent zinc, calcium, magnesium or manganese compounds, and subsequent polycondensation, followed by drawing of the resulting yarn and, as the case may be, hydrosetting of the same at temperatures within a range from 90° to 170° C. in the presence of liquid water, characterized by the fact that a polyester mass is spun, which contains a compound that forms a salt with the cation of the transesterification catalyst and that the salt is soluble with difficulty in the polyester melt, or is present as a complex.

Preferably, one or several of the following compounds are used as salt former for the transesterification catalyst: pelargonic acid, potassium hydrogen sulfate, potassium dihydrogen phosphate, potassium hydrogen phthalate, potassium oxalate, potassium carbonate, potassium oxalate and oxalic acid.

It is advantageous to use the salt former in stoichiometric quantities with the metal cation of the transesterification catalyst.

In an especially advantageous version of the process pursuant to the invention, a polyester mass is spun, to which the salt former has been added already before transesterification.

Preparation of a polyester mass containing oxalato complexes, the spinning of the same, subsequent drawing and, as the case may be, hydrosetting of the resulting fibers in the presence of liquid water can be performed in a manner that is known as such, and is e.g., described in U.S. Pat. Nos. 4,307,152 and 4,371,485, the disclosures of which are hereby incorporated into this application by reference.

Addition, pursuant to the invention, of the compound acting as salt former for the transesterification catalyst can be made in various ways.

Thus, it is possible to add the salt former already to the initial materials used for the preparation of the polyester, i.e., it can be added to the transesterification mixture, consisting of terephthalic ester, ethylene glycol and transesterification catalyst, as the case may be, polycondensation catalysts and other additives, already before transesterification.

It is also possible to add the salt former to the reaction mixture only between transesterification reaction and polycondensation.

It is furthermore especially advantageous, if the salt former is added only to the finished polycondensate, which is suitably present in the form of chips. This can be accomplished by applying the salt former to the chips in a suitable manner, e.g., by treating them with a solution or dispersion of the salt former, e.g., in ethylene glycol.

The substances used as salt formers are intended to form sparingly soluble salts, or complexes, with the transesterification catalysts, i.e. with the cations of the same. Thus, the formed salt is to be soluble with difficulty in the polyester melt, or be present there as complex. Those compounds are especially suitable for concomitant use, which form sparingly soluble salts, or complexes, with zinc, calcium, magnesium or manganese, which are usually present in the transesterification catalysts as divalent cation. Thus, e.g., potassium hydrogen oxalate forms complex zinc compounds with zinc acetate, a conventional transesterification catalyst.

Preferably, the substances to be added are used in stoichiometric quantities with the metal atom of the transesterification catalyst. Greater quantities, i.e., an excess salt former with the transesterification catalyst can of course also be used; in many cases, a less than stoichiometric quantity will be sufficient, but it may be possible to observe a declining effect with declining quantities.

It was especially surprising that, as a result of the concomitant use of the salt formers pursuant to the invention it is possible to attain considerably longer spinning plate running times during the spinning of the polyester masses containing oxalato complexes.

For example, under otherwise the same conditions, a pressure of 260 bar is reached already within about 60 to 70 hours in a normal spinning process making use of polyester masses pursuant to the disclosure of the previously referred to U.S. patents, but without use of the salt formers pursuant to the invention. With the use of the salt formers pursuant to the invention, this pressure will occur only in about 90 to 120 hours, which means that the spinning plate running times have become almost twice as long. This extension of spinning plate running times makes the process for the manufacture of flame-resistant and, as the case may be, hydrophilic polyester fibers considerably more economical, since spinning out and changing of the spinning plates becomes necessary only after twice the time as has been the case heretofore.

Due to the fact that the pressure rises more slowly, the spinning plates as a whole are subjected to less stress and remain usable for much longer.

Since the process pursuant to the invention makes it possible to work longer without spinning until empty, there is also a considerable increase in the number of spools that can be filled without tying of the yarn.

The invention is explained in more detail by the below example:

EXAMPLE

The Oxalato Complex was prepared and found as follows: $K_3[Al(C_2O_4)]$ was prepared in the manner described by J. C. Bailar and E. M. Jones in Inorganic Synthesis 1 (1939), p. 36. Subsequently, the resulting complex salt was dried for 15 hours at 150° C. and about 10 Torr. The analysis of specimens obtained from various batches was between $K_{2.87}[Al(C_2O_4)_{3.02}]$ and $[K_{3.36}Al(C_2O_4)_{3.46}]$.

200 g of the dried complex salt, together with 400 g of ethylene glycol, were ground for about 2 hours in a pearl mill (model PM1, of the firm Draiswerke, Mannheim) with 410 g of quartz beads of a diameter of 1 to 3 mm. After grinding, the diameter of the biggest complex salt particles in the dispersion was about $4\mu$, while the majority of the particles had a size of $1\mu$. After that, the quartz beads were removed by filtering through a screen, rinsed with 200 ml of ethylene glycol and during 72 hours in tall storage vessels, the particles having a size of more than $2\mu$ were far-reachingly removed from the dispersion (sedimentation). Transesterification and polycondensation was accomplished as follows: 1350 g of dimethyl terephthalate and 1200 g of ethylene glycol are transesterified in the usual manner, making use of 150 ppm of zinc acetate. Then, at a temperature of about 250° C. and a stirring rate of 350 rpm, the transesterification product is transferred to a polycondensation vessel. 200 ppm of antimony trioxide as condensation catalyst, as well as 600 g of the dilute dispersion are added. In addition, 530 ppm of potassium hydrogen phosphate are added to the polycondensation batch. After polycondensation, the mass was made into chips in the usual manner and, under a vacuum of 2 Torr. dried for 9 hrs. at 150° C. and for 3 hrs. at 175° C. The chips were spun into a dtex 76 f 24 yarn in the usual manner. The progress of spinning presented no problems. Compared with the spinning of polycondensates without the addition pursuant to the invention, of the salt former potassium hydrogen phosphate, it was possible to extend the spinning plate running time by 3 to 4 days before the pressure rose to 230 bar.

Hot drawing at a ratio of 1:3.64 of the spun yarn finished in the usual manner went very well. A check for flecks and yarn purity resulted in low fleck and defect data.

I claim:

1. A process for the preparation of polyester fibers comprising the steps of
   (1) obtaining a polyester mass by the transesterification and subsequent polycondensation of terephthalic esters with ethylene glycol in the presence of transesterification catalysts containing metal cations, said cations being taken from the group consisting of divalent zinc, calcium, magnesium or manganese compounds;
   (2) spinning said polyester mass with from 1 to 20% by weight of an oxalato complex of the general formula $$Me_n[Z(C_2O_4)m]$$

wherein Me is an ion taken from the group consisting of Li, Na, K, Rb, Cs and NH$_4$; Z is a complex-forming central atom taken from the group consisting of Mg, X, Ae, V, Zr, Hf, Ce, V, Cr, Mn, Fe, Co, Ni, Cu, Zn, Cd, B, Al, Ga, In, Sn, Pb, and Sb; n is ~1, ~2, ~3, or ~4; and m is ~2, ~3, or ~4;
   (3) drawing the resulting fibers; and
   (4) hydrosetting said fibers at an elevated temperature in the presence of liquid water;

characterized in that there is incorporated into the polyester mass, prior to spinning, a compound forming a sparingly soluble salt or a complex with the cation of said transesterification catalyst.

2. The process of claim 1, wherein the salt or complex forming compound is selected from the group consisting of pelargonic acid, potassium hydrogen sulfate, potassium dihydrogen phosphate, potassium hydrgen phthalate, potassium oxalate, potassium carbonate, potassium hydrogen oxalate, and oxalic acid.

3. The process of claim 1 or 2, wherein the salt or complex forming compound is used in stoichiometric quantities with the metal cation of the transesterification catalyst.

4. The process of claim 1, wherein said salt or complex forming compound is added prior to the transesterification reaction.

5. The process of claim 1, wherein said salt or complex forming compound is added between the transesterification reaction and the polycondensation reaction.

6. The process of claim 1, wherein said salt or complex forming compound is added to the finished polyester mass.

7. The process of claim 1, wherein the hydrosetting temperature is from 90° C. to 170° C.

* * * * *

UNITED STATES PATENT AND TRADEMARK OFFICE
CERTIFICATE OF CORRECTION

PATENT NO. : 4,545,949

DATED : October 8, 1985

INVENTOR(S) : Wolfgang Lange

It is certified that error appears in the above—identified patent and that said Letters Patent is hereby corrected as shown below:

Column 5, line 27, change "X, Ae, V," to "Ca, Sr, Ba,"

Signed and Sealed this

Tenth Day of February, 1987

Attest:

DONALD J. QUIGG

Attesting Officer

Commissioner of Patents and Trademarks